United States Patent
Tsai et al.

(10) Patent No.: US 8,395,343 B2
(45) Date of Patent: Mar. 12, 2013

(54) ROTATION SPEED CONTROL CIRCUIT, ROTATION SPEED CONTROL METHOD AND FAN SYSTEM

(75) Inventors: Ming-Jung Tsai, Chang-Hua (TW); Kun-Min Chen, Changhua County (TW); Ching-Sheng Li, Hsinchu County (TW); Sung-Ming Lai, Hsinchu (TW)

(73) Assignee: Anpec Electronics Corporation, Hsinchu Science Park, Hsin-Chu (TW)

( * ) Notice: Subject to any disclaimer, the term of this patent is extended or adjusted under 35 U.S.C. 154(b) by 346 days.

(21) Appl. No.: 12/908,861

(22) Filed: Oct. 20, 2010

(65) Prior Publication Data
US 2012/0007526 A1    Jan. 12, 2012

(30) Foreign Application Priority Data
Jul. 7, 2010 (TW) .............................. 99122339 A

(51) Int. Cl.
*G05B 11/28* (2006.01)
(52) U.S. Cl. ........................................ 318/599; 388/800
(58) Field of Classification Search .................. 318/599; 388/800, 804, 811, 819, 901, 915
See application file for complete search history.

(56) References Cited

U.S. PATENT DOCUMENTS

| | | | | |
|---|---|---|---|---|
| 4,588,934 A | * | 5/1986 | Suzuki et al. | 318/449 |
| 5,457,766 A | * | 10/1995 | Ko | 388/831 |
| 5,497,062 A | * | 3/1996 | Fenstermacher et al. | 318/599 |
| 5,825,972 A | * | 10/1998 | Brown | 388/811 |
| 5,952,798 A | * | 9/1999 | Jones et al. | 318/268 |
| 6,021,252 A | * | 2/2000 | Faris et al. | 388/831 |
| 6,040,668 A | * | 3/2000 | Huynh et al. | 318/471 |
| 6,130,989 A | * | 10/2000 | Mizumoto et al. | 388/815 |
| 7,119,522 B1 | * | 10/2006 | Tomiyoshi | 323/224 |
| 7,479,753 B1 | * | 1/2009 | Mimberg | 318/599 |

FOREIGN PATENT DOCUMENTS
TW 201011503 3/2010

* cited by examiner

*Primary Examiner* — Rina Duda
(74) *Attorney, Agent, or Firm* — Winston Hsu; Scott Margo

(57) ABSTRACT

A rotation speed control circuit for controlling a rotation speed of a fan includes: a rotation speed detector, for generating a rotation speed voltage according to a rotation speed signal corresponding to the rotation speed; a sample and hold element, coupled to the rotation speed detector, for sampling and storing the rotation speed voltage; an error amplifier, coupled to the sample and hold element, for controlling a voltage of a filter capacitor according to the rotation speed voltage and a reference voltage, to adjust an error voltage; and a pulse width modulation signal generator, coupled to the filter capacitor, for generating a pulse width modulation signal according to the error voltage and a triangle wave.

25 Claims, 15 Drawing Sheets

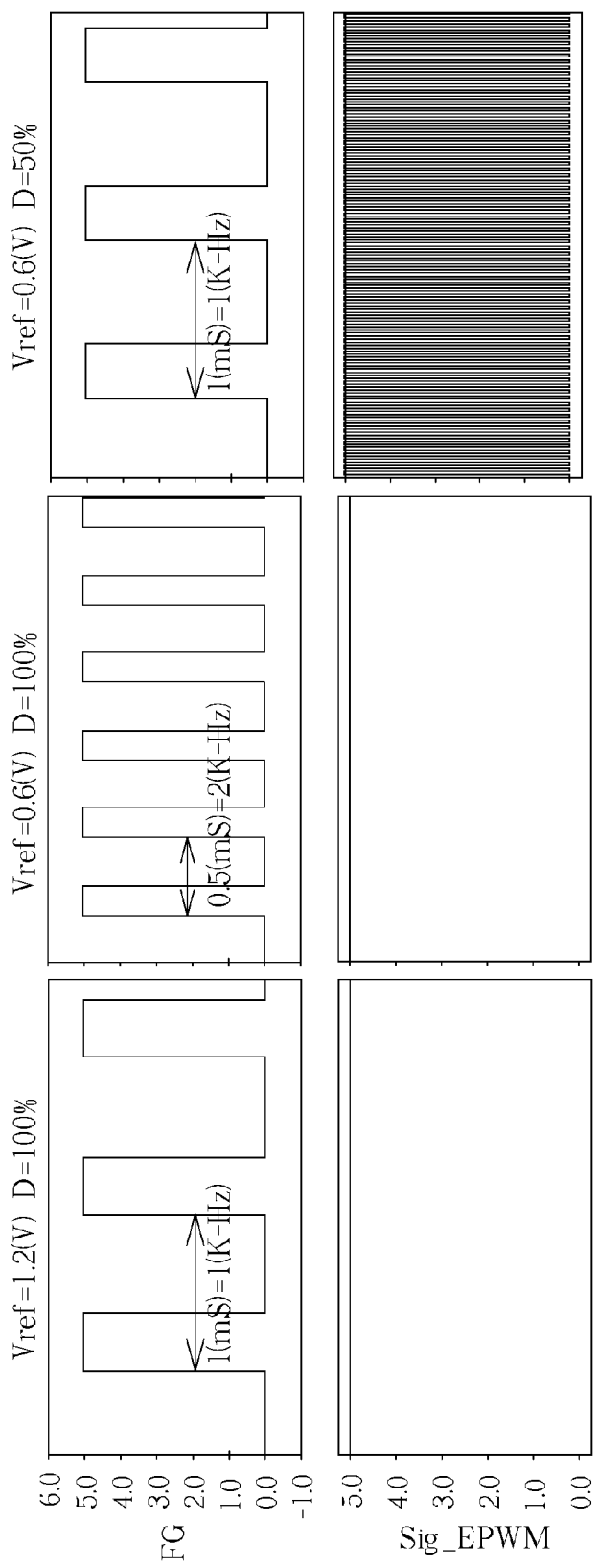
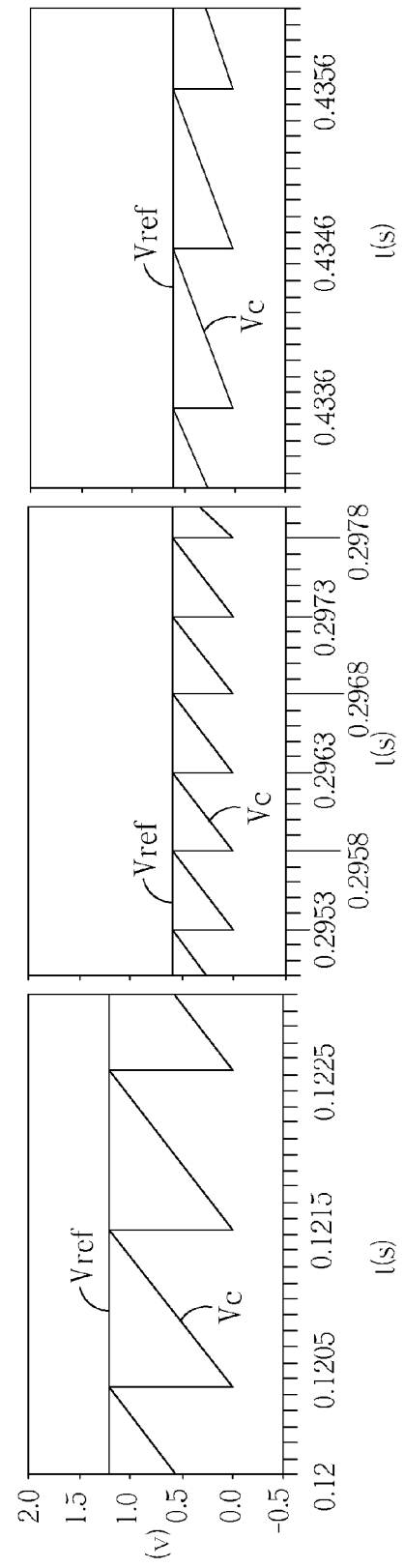
FIG. 6B  FIG. 6C  FIG. 6D

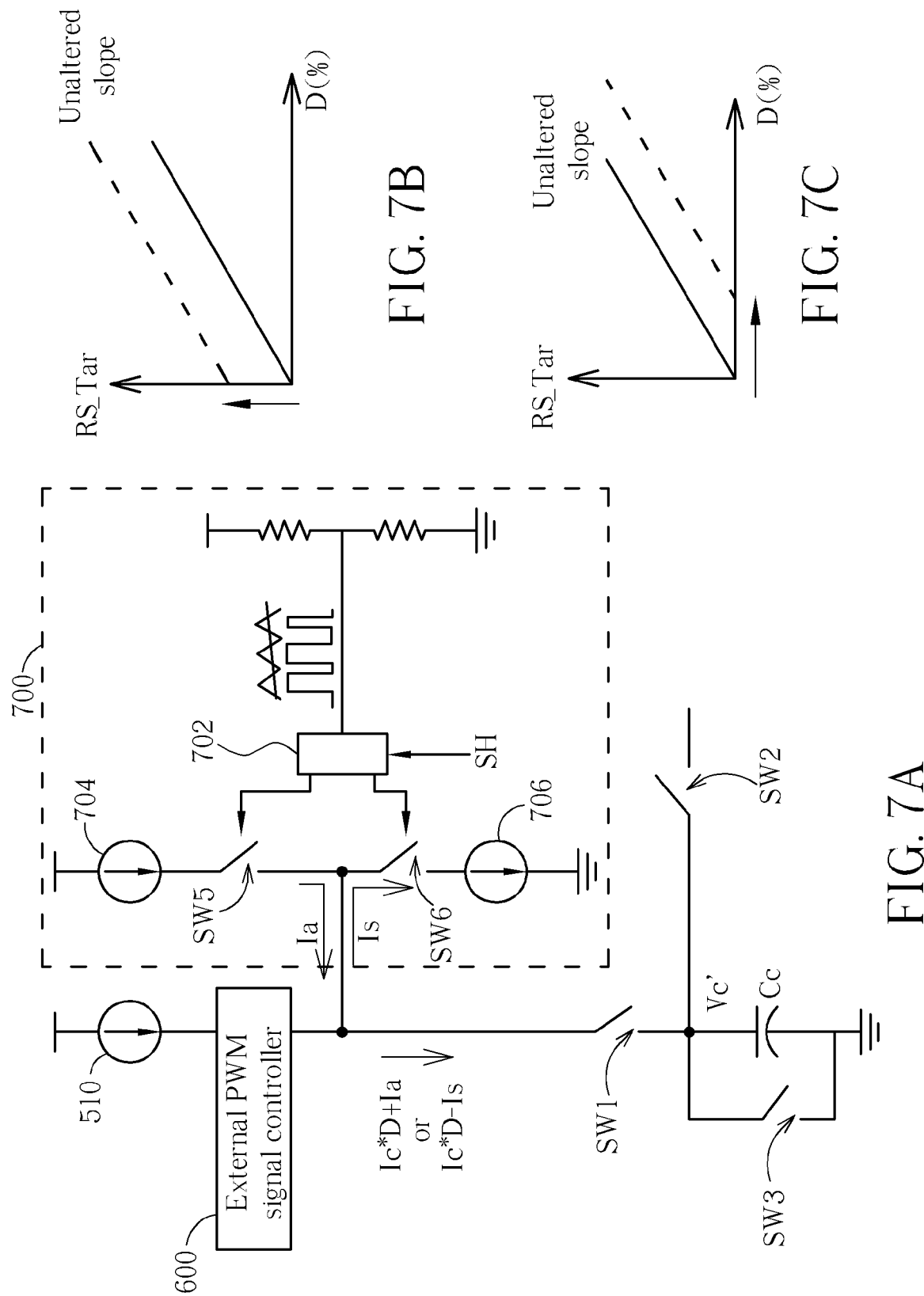

ROTATION SPEED CONTROL CIRCUIT, ROTATION SPEED CONTROL METHOD AND FAN SYSTEM

BACKGROUND OF THE INVENTION

1. Field of the Invention

The present invention relates to a rotation speed control circuit, rotation speed control method, and a fan system, and more particularly, to a rotation speed control circuit, rotation speed control method, and a fan system capable of stabilizing a rotation speed.

2. Description of the Prior Art

Computer systems are essential information tools for most people. For a personal computer, a laptop, or a server, etc., an operating clock of a central processing unit has become higher, as has heat emission, such that requirements of heat dissipation have become more essential as well.

Prior art computers utilize a fan with a steady rotation speed to dissipate heat. However, when a system voltage varies, or the fan is affected by a background pressure, i.e. air pressure, in a closed environment, the rotation speed may vary as well. Therefore, the prior art usually needs to utilize a rotation speed control circuit to perform negative feedback according to the rotation speed, so as to control the rotation speed and prevent the rotation speed from becoming too fast or too slow.

Please refer to FIG. 1, which is a schematic diagram of a conventional fan system 10. The fan system 10 includes a fan 102, a fan driving circuit 104, a rotation speed determination device 106 and a rotation speed control circuit 108. The rotation speed control circuit 108 controls the fan driving circuit 104 to drive a rotation speed RS of the fan 102 at a target rotation speed RS_Tar. The rotation speed control circuit 108 includes a rising edge trigger 110, an external RC pin 112, a pulse width modulation (PWM) signal generator 114 and a first-order integrator 116. In short, the rotation speed determination device 106 generates a rotation speed signal FG according to the rotation speed RS of the fan 102. The rising edge trigger 110 is triggered at a rising edge of the rotation speed signal FG, to start charging the external RC pin 112 until a charging voltage Vc equals a specific voltage. During the time the external RC pin 112 performs charging operations, the PWM signal generator 114 sets an outputted PWM signal Sig_PWM as off-time. The first-order integrator 116 performs integration according to the PWM signal Sig_PWM, to generate a driving voltage Vd, such that the fan driving circuit 104 drives the fan 102 according to the driving voltage Vd.

For further details, please refer to FIG. 2, which is a schematic diagram of the rotation speed signal FG, the PWM signal Sig_PWM and charging voltage Vc of the fan system 10 shown in FIG. 1. As can be seen from FIG. 2, since the charging time of the external RC pin 112 is fixed, i.e. the off-time of the PWM signal Sig_PWM is fixed, the on-time of the PWM signal Sig_PWM can be taken as a period of the rotation speed signal FG minus the fixed charging time. In such a situation, if the rotation speed RS equals the target rotation speed RS_Tar, the period of the rotation speed signal FG is fixed, and thus the on-time of the PWM signal Sig_PWM, i.e. the period of the rotation speed signal FG minus the fixed charging time, is fixed as well. Therefore, the driving voltage Vd integrated by the first-order integrator 116 is also fixed, such that the fan driving circuit 104 can maintain the rotation speed RS at the target rotation speed RS_Tar.

If the rotation speed RS is less than the target rotation speed RS_Tar, the period of the rotation speed signal FG increases, and thus the on-time of the PWM signal Sig_PWM, i.e. the period of the rotation speed signal FG minus the fixed charging time, increases as well. Therefore, the driving voltage Vd integrated by the first-order integrator 116 also increases, such that the fan driving circuit 104 can increase the rotation speed RS to reach the target rotation speed RS_Tar. Similarly, if the rotation speed RS is greater than the target rotation speed RS_Tar, the period the rotation speed signal FG decreases, and the on-time of the PWM signal Sig_PWM decreases as well, such that the driving voltage Vd decreases as well. Therefore, the fan driving circuit 104 can decrease the rotation speed RS to reach the target rotation speed RS_Tar. As can be seen from the above description, the rotation speed control circuit 108 can perform negative feedback to stabilize the rotation speed RS.

The above prior art method, however, needs to utilize the external RC pin 112 and the first-order integrator 116 which includes two resistors and one capacitor to generate the driving voltage Vd. Therefore, when a user intends to adjust the target rotation speed RS_Tar, the user needs to consider complex calculations for the first-order integrator 116 and the external RC pin 112, and thus can not intuitively modify the target rotation speed RS_Tar to meet system requirements. Thus, there is a need for improvement of the prior art.

SUMMARY OF THE INVENTION

It is therefore an objective of the present invention to provide a rotation speed control circuit, rotation speed control method and fan system.

The present invention discloses a rotation speed control circuit for controlling a rotation speed of a fan. The rotation speed control circuit includes a rotation speed detector, for generating a rotation speed voltage according to a rotation speed signal corresponding to the rotation speed, a sample and hold unit, coupled to the rotation speed detector, for sampling and storing the rotation speed voltage, an error amplifier, coupled to the sample and hold unit, for controlling a voltage across a filter capacitor according to the rotation speed voltage and a reference voltage, to adjust an error voltage, and a pulse width modulation (PWM) signal generator, coupled to the filter capacitor, for generating a PWM signal according to the error voltage and a triangle wave.

The present invention further discloses a fan system capable of controlling a rotation speed. The fan system includes a fan, a fan driving circuit, for driving the fan according to a pulse width modulation (PWM) signal, a rotation speed determination device, for generating a rotation speed signal according to the rotation speed of the fan, and a rotation speed control circuit, for controlling the rotation speed. The rotation speed control circuit includes a rotation speed detector, for generating a rotation speed voltage according to a rotation speed signal, a sample and hold unit, coupled to the rotation speed detector, for sampling and storing the rotation speed voltage, an error amplifier, coupled to the sample and hold unit, for controlling a voltage across a filter capacitor according to the rotation speed voltage and a reference voltage, to adjust an error voltage, and a PWM signal generator, coupled to the filter capacitor, for generating the PWM signal according to the error voltage and a triangle wave.

The present invention further discloses a rotation speed control method for controlling a rotation speed of a fan. The rotation speed control method includes steps of generating a rotation speed voltage according to a rotation speed signal, controlling a voltage across a filter capacitor according to the rotation speed voltage and a reference voltage, to adjust an error voltage, and generating a pulse width modulation (PWM) signal according to the error voltage and a triangle wave.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 6B to FIG. 6D are schematic diagrams of signals of the rotation speed control circuit shown in FIG. 6A under different duties of an external PWM signal and different reference voltages.

FIG. 7A is a schematic diagram of the rotation speed control circuit shown in FIG. 6A further including a shifting device.

FIG. 7B and FIG. 7C are schematic diagrams of a target rotation speed of FIG. 7A under different duties after a Y-axis shift and an X-axis shift, respectively.

DETAILED DESCRIPTION

Figure 1:
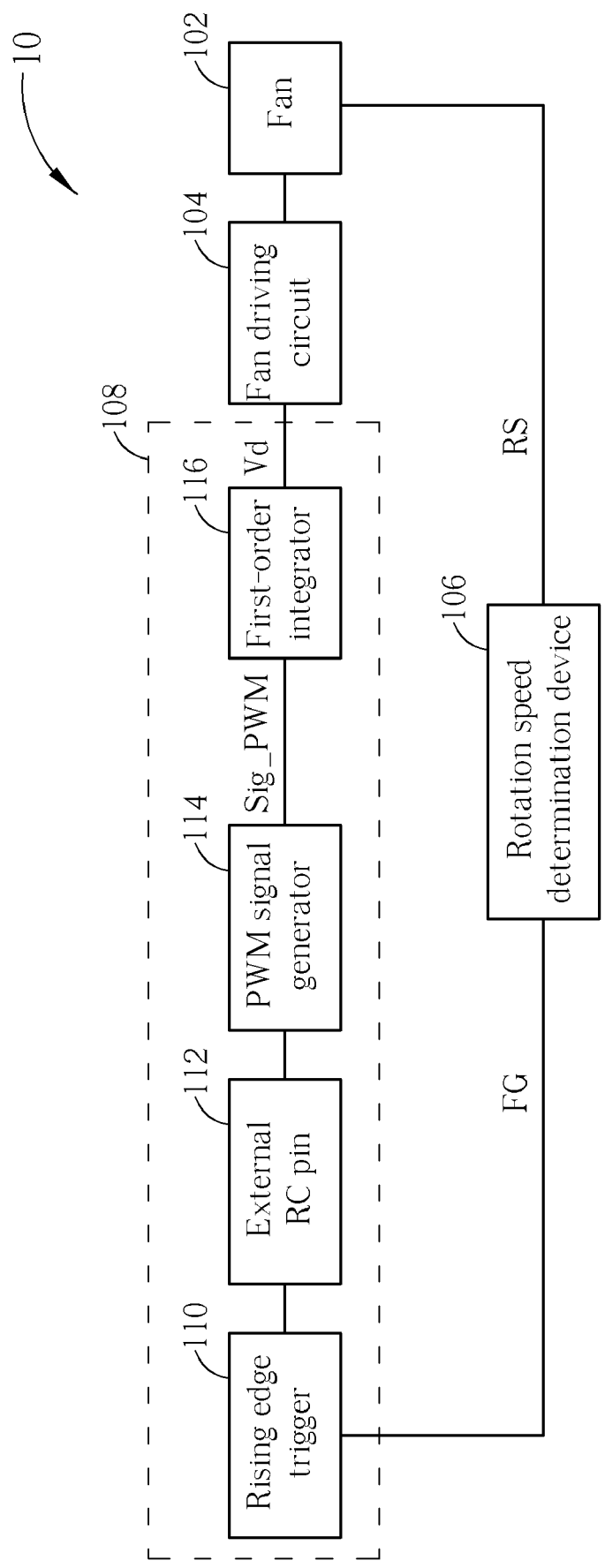
FIG. 1 is a schematic diagram of a conventional fan system.
Figure 2:
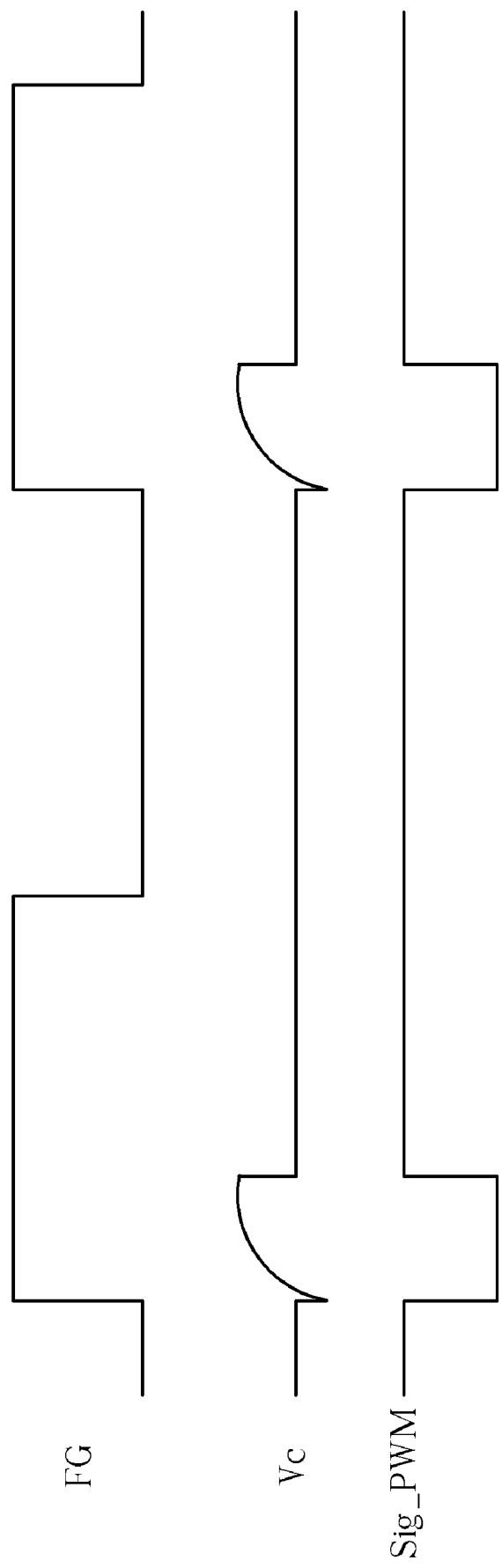
FIG. 2 is a schematic diagram of a rotation speed signal, a PWM signal and a charging voltage of the fan system shown in FIG. 1.
Figure 3:
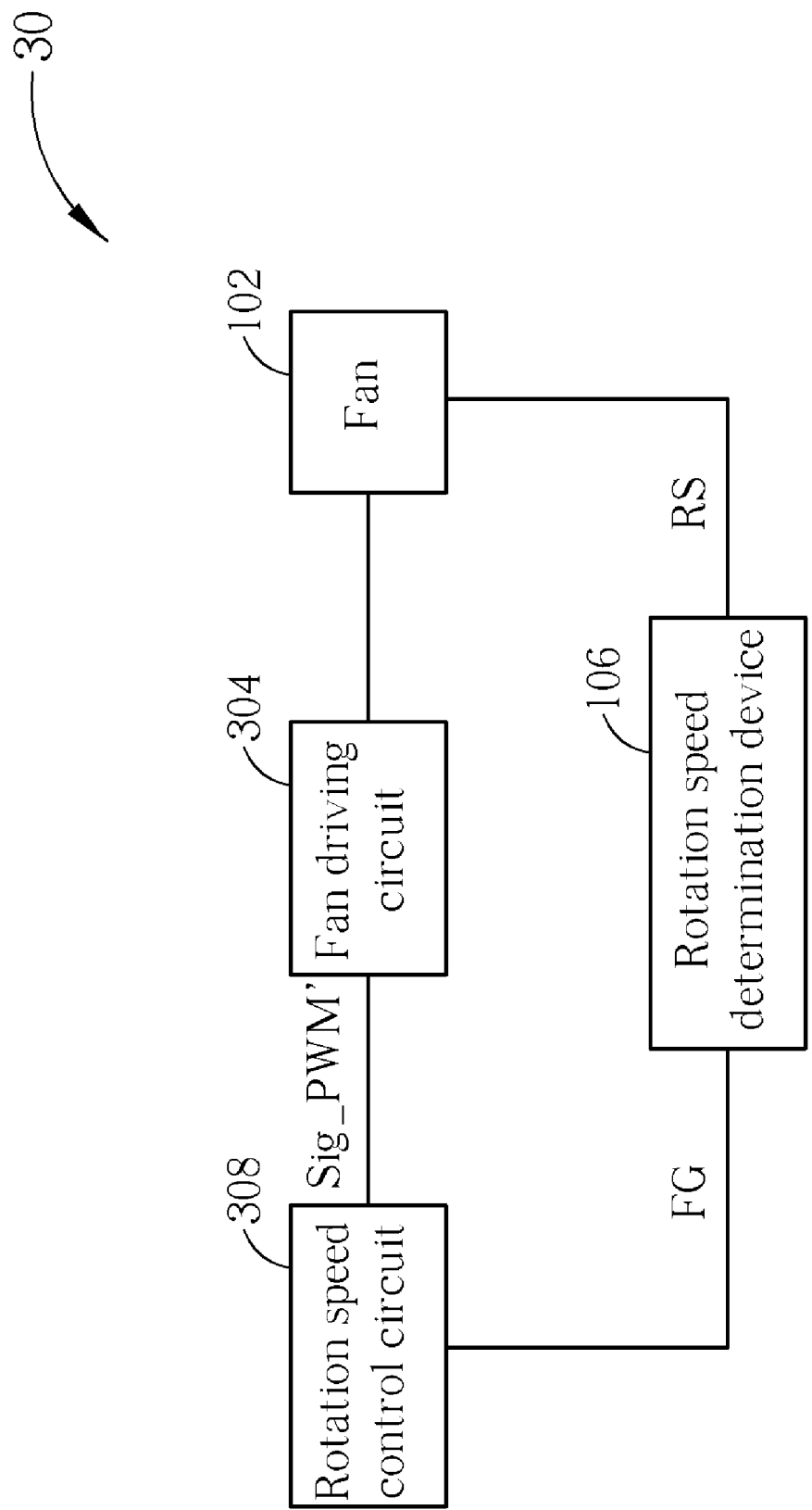
FIG. 3 is a schematic diagram of a fan system according to an embodiment of the present invention.

Please refer to FIG. 3, which is a schematic diagram of a fan system 30 according to an embodiment of the present invention. Partial structure and operating principles of the fan system 30 are similar to those of the fan system 10, and thus elements and signals with the same functions are denoted by the same symbols for simplicity. Differences between the fan system 30 and the fan system 10 are that circuitry structure of a rotation speed control circuit 308 is different from that of the rotation speed control circuit 108. The rotation speed control circuit 308 alters on-time of an outputted PWM signal Sig_PWM', such that a fan driving circuit 304 can drive the rotation speed RS at the target rotation speed RS_Tar, and the user can adjust the target rotation speed RS_Tar by intuitively modifying circuitry parameters of the rotation speed control circuit 308.

Figure 4:
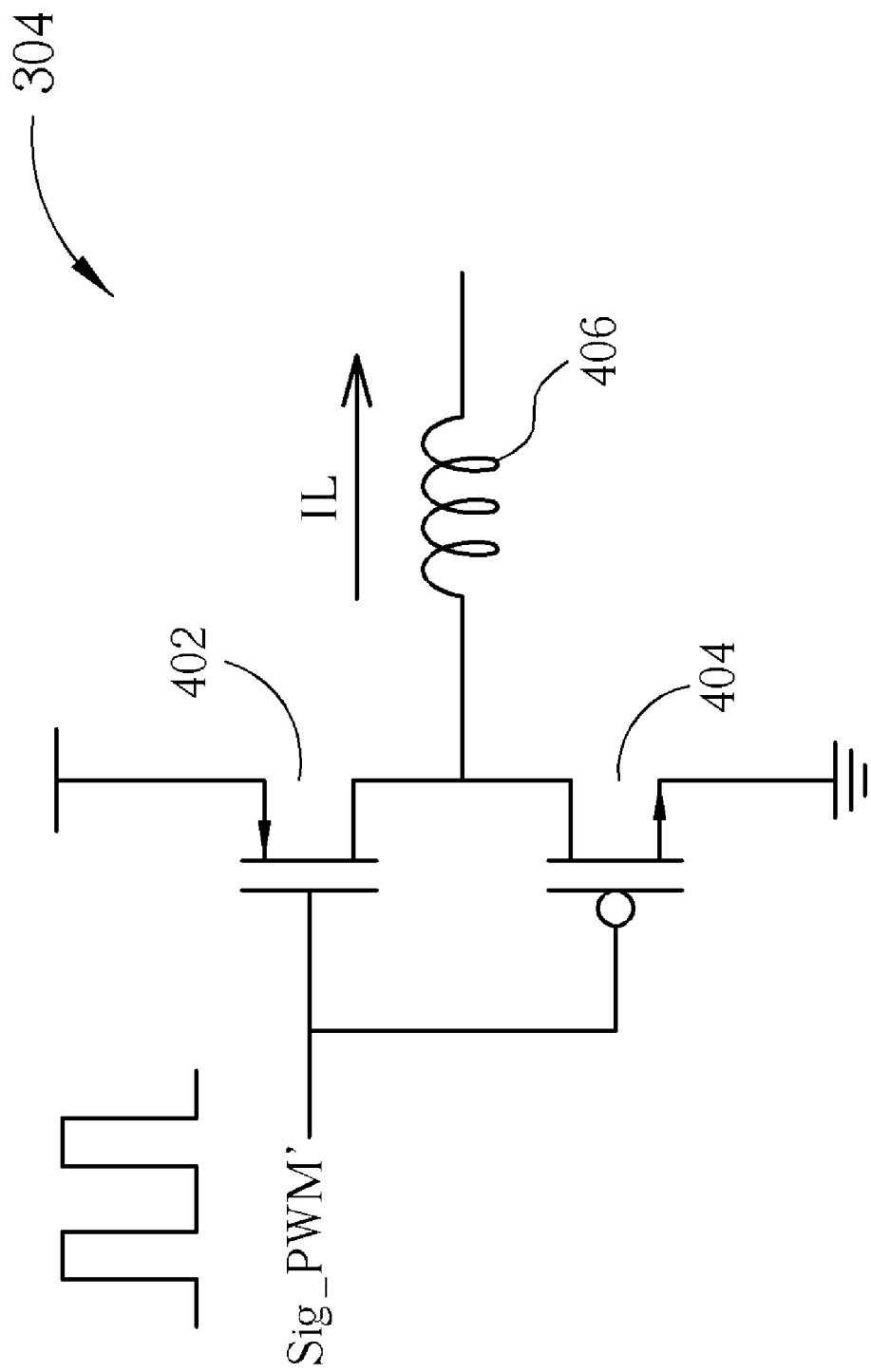
FIG. 4 is a schematic diagram of a fan driving circuit shown in FIG. 3.

Please refer to FIG. 4, which is a schematic diagram of the fan driving circuit 304 shown in FIG. 3. The fan driving circuit 304 includes an upper gate switch 402, a lower gate switch 404 and an inductor 406. In short, the fan driving circuit 304 receives the PWM signal Sig_PWM' generated by the rotation speed control circuit 308. During the on-time of the PWM signal Sig_PWM', the upper gate switch 402 is turned on and the lower gate switch 404 is turned off, such that the inductor 406 generates an inductor current IL to drive the fan 102; and during the off-time of the PWM signal Sig_PWM', the upper gate switch 402 is turned off and the lower gate switch 404 is turned on, such that the fan driving circuit 304 stops driving the fan 102. As a result, the rotation speed control circuit 308 can adjust the rotation speed RS by altering the on-time of the outputted PWM signal Sig_PWM'.

Figure 5A:
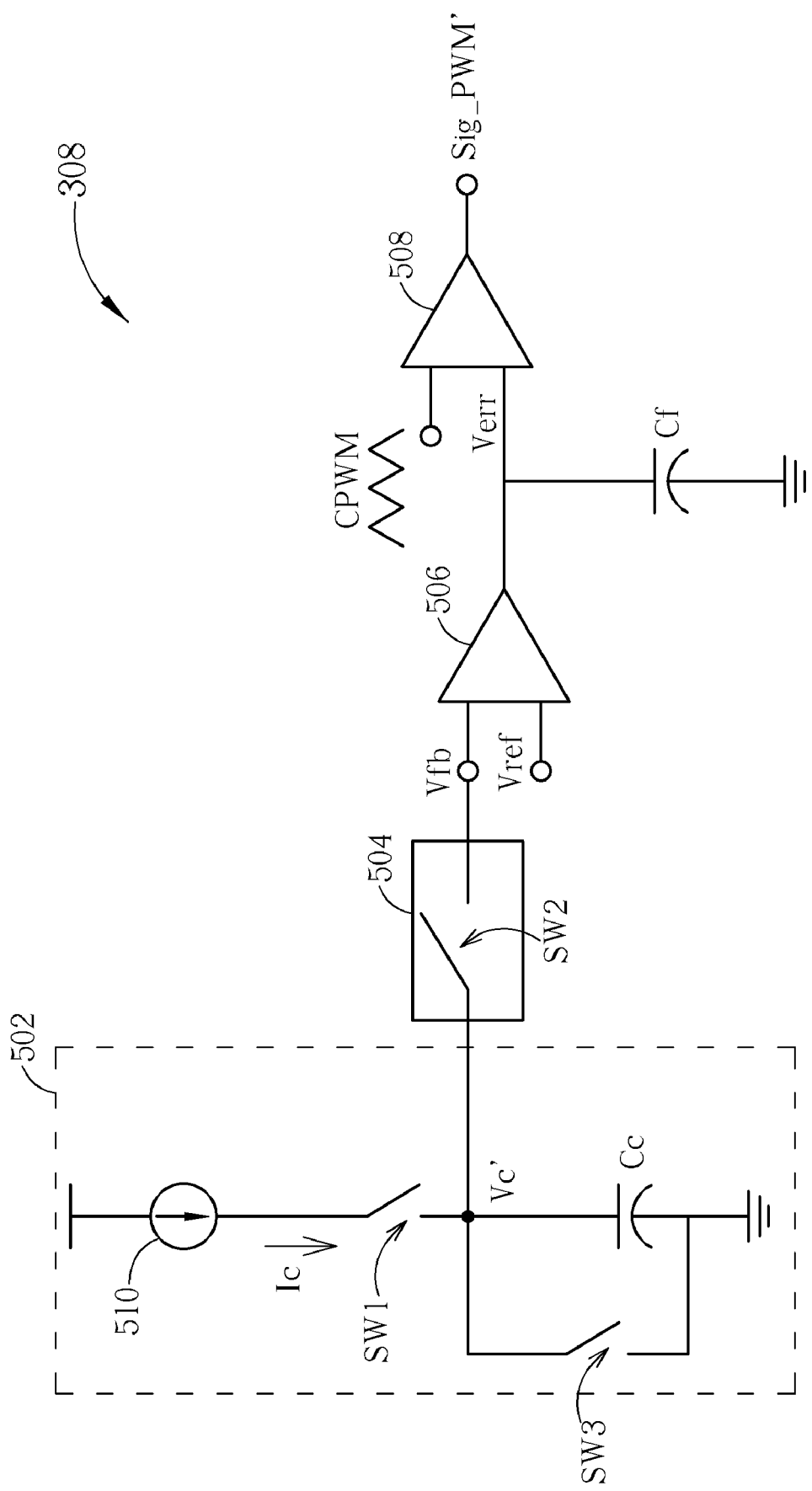
FIG. 5A is a schematic diagram of the rotation speed control circuit shown in FIG. 3

Please refer to FIG. 5A, which is a schematic diagram of the rotation speed control circuit 308 shown in FIG. 3. The rotation speed control circuit 308 includes a rotation speed detector 502, a sample and hold unit 504, an error amplifier 506 and a PWM signal generator 508. The rotation speed detector 502 includes a current source 510, switches SW1, SW3 and a charging capacitor Cc, for generating a rotation speed voltage Vfb according to the rotation speed signal FG. The sample and hold unit 504 samples and stores the rotation speed voltage Vfb, and can be realized by a switch SW2 or other devices. The error amplifier 506 controls a voltage across a filter capacitor Cf according to the rotation speed voltage Vfb and a reference voltage Vref, to adjust an error voltage Verr. The PWM signal generator 508 generates the PWM signal Sig_PWM' according to the error voltage Verr and a triangle wave CPWM. As a result, the rotation speed control circuit 308 can alter the on-time of the PWM signal Sig_PWM' according to the rotation speed signal FG, so as to maintain the rotation speed RS at the target rotation speed RS_Tar.

Figure 5B:
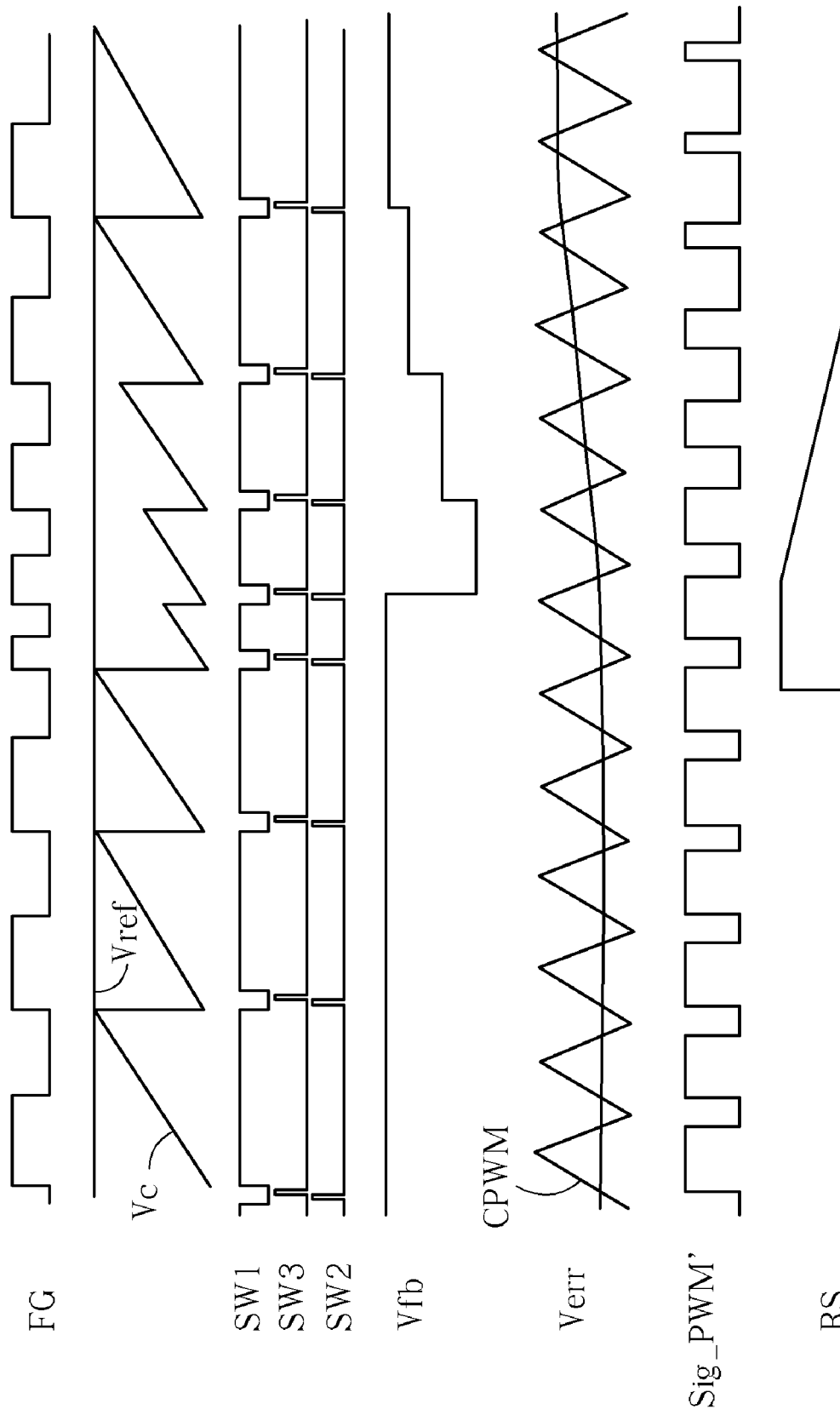
FIG. 5B is a schematic diagram of the rotation speed control circuit shown in FIG. 5A performing control operations when a rotation speed increases.

For further details, please refer to FIG. 5B, which is a schematic diagram of the rotation speed control circuit 308 shown in FIG. 5A performing control operations when the rotation speed RS increases. In an initial state, the switch SW1 is turned on at a rising edge of the rotation speed signal FG, such that a charging current Ic generated by the current source 510 passes the switch SW1 to charge the charging capacitor Cc, to increase a charging voltage Vc' across the charging capacitor Cc. Then, at a next rising edge of the rotation speed signal FG, the switch SW1 is turned off and the switch SW2 is turned on, to output the instant charging voltage Vc' as the rotation speed voltage Vfb. Afterwards, the switch SW2 is turned off and the switch SW3 is turned on, such that the charging capacitor Cc is connected to ground, to discharge the charging voltage Vc' to 0V. Finally, the switch SW3 is turned off and the switch SW1 c is turned on, to restart conducting the charging current Ic to charge the charging capacitor Cc. In addition, the sample and hold unit 504 stores the rotation speed voltage Vfb, such that the error amplifier 506 compares the stored rotation speed voltage Vfb with the reference voltage Vref before a subsequent rising edge of the rotation speed signal FG. Thus, the error amplifier 506 can decide to charge or discharge the filter capacitor Cf, so as to adjust the error voltage Verr, such that the PWM signal generator 508 can generate the PWM signal Sig_PWM' with different on-time, so as to maintain the rotation speed RS at the target rotation speed RS_Tar.

In such a situation, if the rotation speed RS equals the target rotation speed RS_Tar, since the charging voltage Vc' resulted from the charging current Ic charging the charging capacitor Cc during a period of the rotation speed signal FG equals the reference voltage Vref, the rotation speed voltage Vfb outputted at a rising edge of the rotation speed signal FG also equals the reference voltage Vref. Therefore, the error amplifier 506 does not alter the voltage across the filter capacitor Cf, i.e. the error voltage Verr, such that the PWM signal generator 508 still generates the PWM signal Sig_PWM' with the same on-time after comparing the error voltage Verr with the triangle wave CPWM, so as to maintain the rotation speed RS at the target rotation speed RS_Tar. If the rotation speed RS is greater than the target rotation speed RS_Tar, i.e. a period of the rotation speed signal FG is shorter, since the charging voltage Vc' resulted from the charging current Ic charging the charging capacitor Cc during the period of the rotation speed signal FG is less than the reference voltage Vref, the rotation speed voltage Vfb outputted at a rising edge of the rotation speed signal FG is also less than the reference voltage Vref. Therefore, the error amplifier 506 charges the filter capacitor Cf, to increase the error voltage Verr, such that the PWM signal generator 508 generates the PWM signal Sig_PWM' with shorter on-time after comparing the error voltage Verr with the triangle wave CPWM, so as to decrease the rotation speed RS and thus maintain the rotation speed RS at the target rotation speed RS_Tar. Similarly, if the rotation speed RS is less than the target rotation speed RS_Tar, i.e. a period of the rotation speed signal FG is longer, the rotation speed voltage Vfb is greater than the reference voltage Vref. Therefore, the error amplifier 506 discharges the filter capacitor Cf, to decrease the error voltage Verr, such that the PWM signal generator 508 generates the PWM signal Sig_PWM' with longer on-time, so as to increase the rotation speed RS and thus maintain the rotation speed RS at the target rotation speed RS_Tar.

As can be seen from the above, the exemplary embodiment can maintain the rotation speed RS at the target rotation speed RS_Tar. Furthermore, in the steady state, the rotation speed detector 502 charges the charging capacitor Cc with the charging current Ic during a period of the rotation speed signal FG, so as to generate the rotation speed voltage Vfb equal to the reference voltage Vref, and thus the target rotation speed RS_Tar can be expressed as $RS\_Tar = Ic/(Cc \cdot Vref)$. As a result, when a user intends to adjust the target rotation speed RS_Tar, the user can adjust the charging current Ic, which is proportional to the target rotation speed RS_Tar, or the charging capacitor Cc and the reference voltage Vref, which are inversely proportional to the target rotation speed RS_Tar, to intuitively modify the target rotation speed RS_Tar and thus meet system requirements.

Figure 6A:
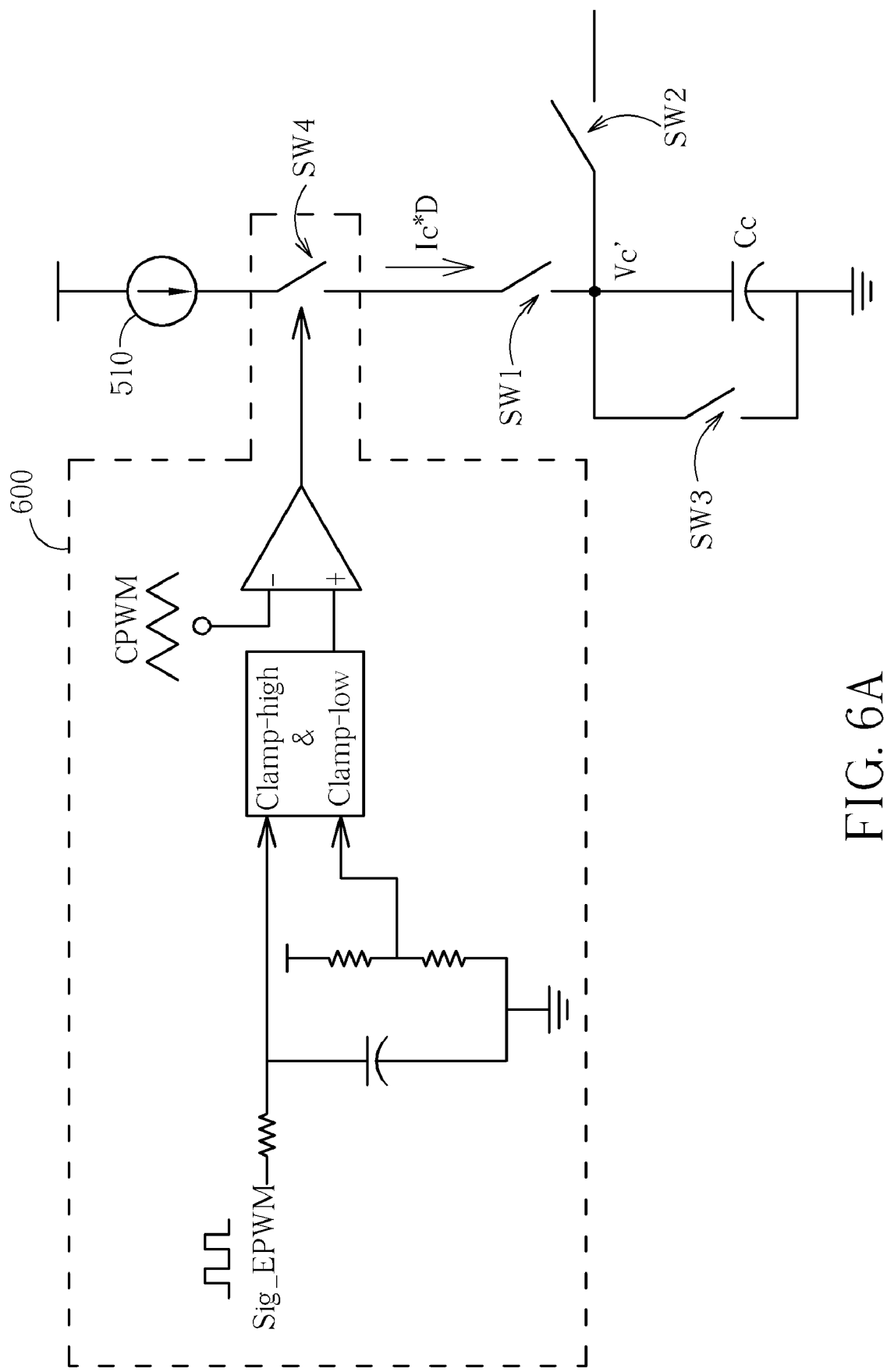
FIG. 6A is a schematic diagram of the rotation speed control circuit shown in FIG. 5A further including an external PWM signal controller.

Please refer to FIG. 6A to FIG. 6D. FIG. 6A is a schematic diagram of the rotation speed control circuit 308 shown in FIG. 5A further including an external PWM signal controller 600, and FIG. 6B to FIG. 6D are schematic diagrams of signals of the rotation speed control circuit 308 shown in FIG. 6A under different duties of an external PWM signal Sig_EPWM and different reference voltages Vref. The external PWM signal controller 600 adjusts a switch SW4 to output the charging current Ic at a proper frequency according to a duty D of the external PWM signal Sig_EPWM, i.e. on-time of the external PWM signal Sig_EPWM, so as to adjust the target rotation speed RS_Tar. Noticeably, since the frequency of the external PWM signal Sig_EPWM is much greater than the target rotation speed RS_Tar, the charging current Ic outputted by the switch SW4 is proportional to a length of the duty D. For example, if the duty D is 100%, i.e. the external PWM signal Sig_EPWM is direct current (DC) voltage input, the charging current Ic outputted by the switch SW4 equals the original charging current Ic; and if the duty D is 50%, i.e. the external PWM signal Sig_EPWM is a pulse input with equal on-time and off-time, the charging current Ic outputted by the switch SW4 is effectively half the original charging current Ic.

Figure 6F:
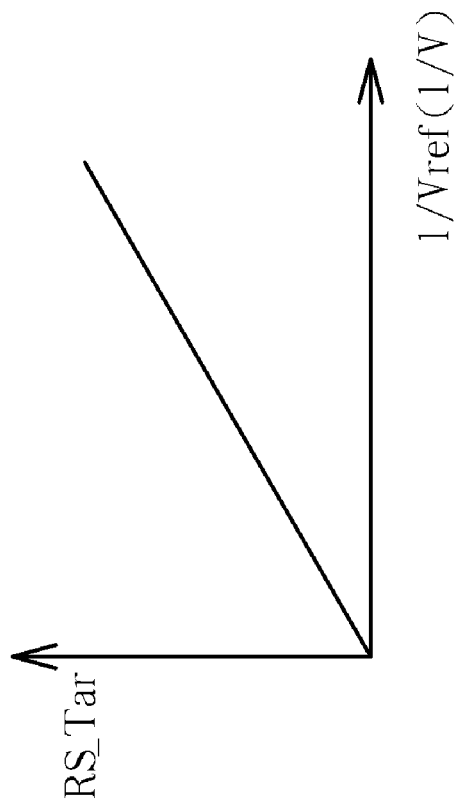
FIG. 6E and FIG. 6F are schematic diagrams of a target rotation speed of FIG. 6A under different duties and reference voltages, respectively.
Figure 6E:
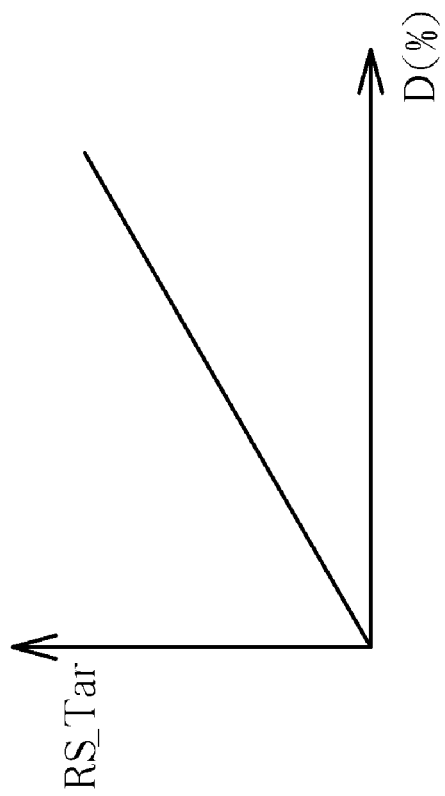

In such a situation, the target rotation speed RS_Tar can be expressed as $RS\_Tar = Ic \cdot D/(Cc \cdot Vref)$. As shown in FIG. 6C and FIG. 6D, since the duty D is 100% in FIG. 6C and 50% in FIG. 6D, time for the charging current Ic to charge the charging capacitor Cc to generate the rotation speed voltage Vfb equal to the reference voltage Vref in FIG. 6C is only half that in FIG. 6D, and thus the target rotation speed RS_Tar in FIG. 6C is twice that in FIG. 6D. As shown in FIG. 6B and FIG. 6C, since the reference voltage Vref in FIG. 6B is twice that in FIG. 6C, time for the charging current Ic to charge the charging capacitor Cc to generate the rotation speed voltage Vfb equal to the reference voltage Vref in FIG. 6B is twice that in FIG. 6C, and thus the target rotation speed RS_Tar in FIG. 6B is half that in FIG. 6C. Please refer to FIG. 6E and FIG. 6F, which are schematic diagrams of the target rotation speed RS_Tar of FIG. 6A under different duties D and reference voltages Vref, respectively. As can be seen from FIG. 6E and FIG. 6F, the target rotation speed RS_Tar is proportional to the duty D and inversely proportional to the reference voltage Vref, and thus the embodiment of the present invention can intuitively modify the target rotation speed RS_Tar by adjusting the duty D or the reference voltage Vref, to meet system requirements.

Please refer to FIG. 7A to FIG. 7C. FIG. 7A is a schematic diagram of the rotation speed control circuit 308 shown in FIG. 6A further including a shifting device 700, and FIG. 7B and FIG. 7C are schematic diagrams of the target rotation speed RS_Tar of FIG. 7A under different duties D after a Y-axis shift and an X-axis shift, respectively. The shifting device 700 includes a controlling device 702, switches SW5, SW6, an adding current source 704 and a subtracting current source 706. The controlling device 702 turns on the switch SW5 to increase the charging current Ic outputted by the switch SW4 with an adding current Ia if a shifting signal SH indicates the Y-axis shift, and the controlling device 702 turns on the switch SW6 to subtract the charging current Ic outputted by the switch SW4 with a subtracting current Is if the shifting signal SH indicates the X-axis shift. In such a situation, the target rotation speed RS_Tar can be expressed as $RS\_Tar = (Ic \cdot D + Ia)/(Cc \cdot Vref)$ or $(Ic \cdot D - Is)/(Cc \cdot Vref)$. As shown in FIG. 7B, since the fixed adding current Ia can charge the charging capacitor Cc without being affected by the duty D, a relation between the target rotation speed RS_Tar and the duty D can be shifted toward positive Y-axis direction without altering a slope, i.e. adding a specific the rotation speed RS_A, such that the target rotation speed RS_Tar can still be the specific rotation speed RS_A when the duty D is 0%. On the other hand, as shown in FIG. 7C, since the charging current Ic outputted by the switch SW4 is required to be greater than the subtracting current Is to start charging the charging capacitor Cc, a relation between the target rotation speed RS_Tar and the duty D can be shifted towards the positive X-axis direction without altering the slope, i.e. the duty D is required to be greater than a specific duty Ds to make the target rotation speed RS_Tar valid. As a result, the relation between the target rotation speed RS_Tar and the duty D can be shifted towards positive X-axis or Y-axis direction without altering the slope, to achieve a minimum rotation speed or a minimum enable duty.

Figures 8A, 8B, 8C:
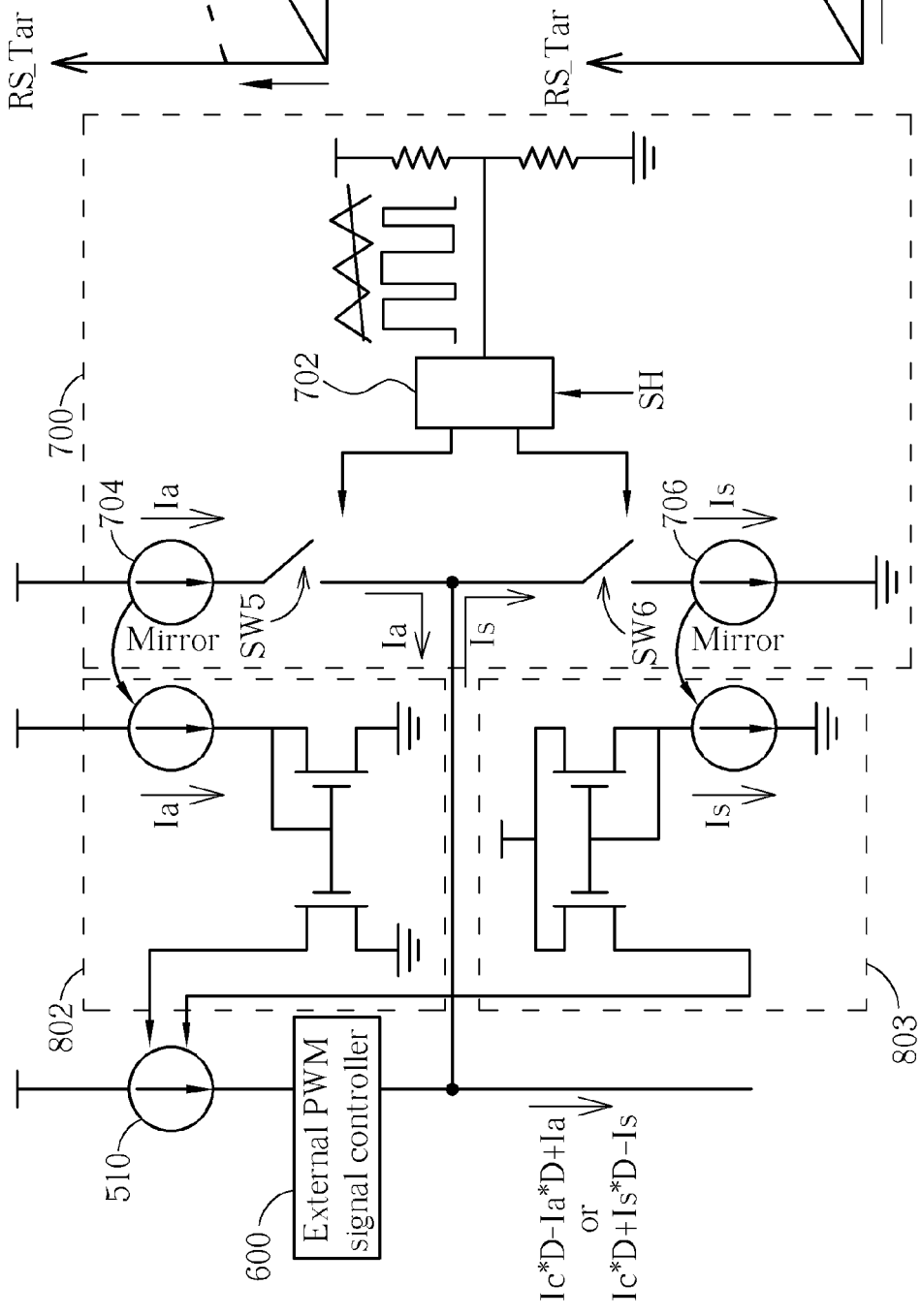
FIG. 8A is a schematic diagram of the shifting device shown in FIG. 7A further including an adding current mirror and a subtracting current mirror.
FIG. 8B and FIG. 8C are schematic diagrams of a target rotation speed of FIG. 8A under different duties after a Y-axis shift and an X-axis shift, respectively.

Moreover, please refer to FIG. 8A to FIG. 8C. FIG. 8A is a schematic diagram of the shifting device 700 shown in FIG. 7A further including an adding current mirror 802 and a subtracting current mirror 804, and FIG. 8B and FIG. 8C are schematic diagrams of the target rotation speed RS_Tar of FIG. 8A under different duties D after a Y-axis shift and an X-axis shift, respectively. The adding current mirror 802 subtracts the charging current Ic with the adding current Ia before the charging current Ic is adjusted according to the duty D if the shifting signal SH indicates the Y-axis shift, and the subtracting current mirror 804 adds the charging current Ic with the adding current Is before the charging current Ic is adjusted according to the duty D if the shifting signal SH indicates the X-axis shift. In such a situation, the target rotation speed RS_Tar can be expressed as RS_Tar=(Ic*D−Ia*D+Ia)/(Cc*Vref) or (Ic*D+Is*D−Is)/(Cc*Vref). As shown in FIG. 8B, other than being added to the fixed adding current Ia which is not affected by the duty D, the charging current Ic is further subtracted from the adding current Ia multiplied by the duty D, and thus the relation between the target rotation speed RS_Tar and the duty D can be shifted towards the positive Y-axis direction with an altered slope. In other words, although the target rotation speed RS_Tar equals the specific rotation speed RS_A when the duty D is 0%, the target rotation speed RS_Tar is converged when the duty D is 100%, i.e. the target rotation speed RS_Tar equals that of FIG. 6E, where the rotation speed control circuit 308 does not include the shifting device 700 since the charging current Ic is added to and subtracted from the same amount of current when the duty D is 100%. Similarly, as shown in FIG. 8C, the shifting device 700 can shift the relation between the target rotation speed RS_Tar and the duty D towards the positive X-axis direction with an altered slope, and the target rotation speed RS_Tar is converged when the duty D is 100%, i.e. the target rotation speed RS_Tar equals that of FIG. 6E, where the rotation speed control circuit 308 does not include the shifting device 700. As a result, the relation between the target rotation speed RS_Tar and the duty D can be shifted towards the positive Y-axis or X-axis direction with an altered slope, to achieve a minimum rotation speed or a minimum enable duty without altering the same maximum target rotation speed RS_Tar acquired by only adjusting the duty D, i.e. converging.

Figure 9A:
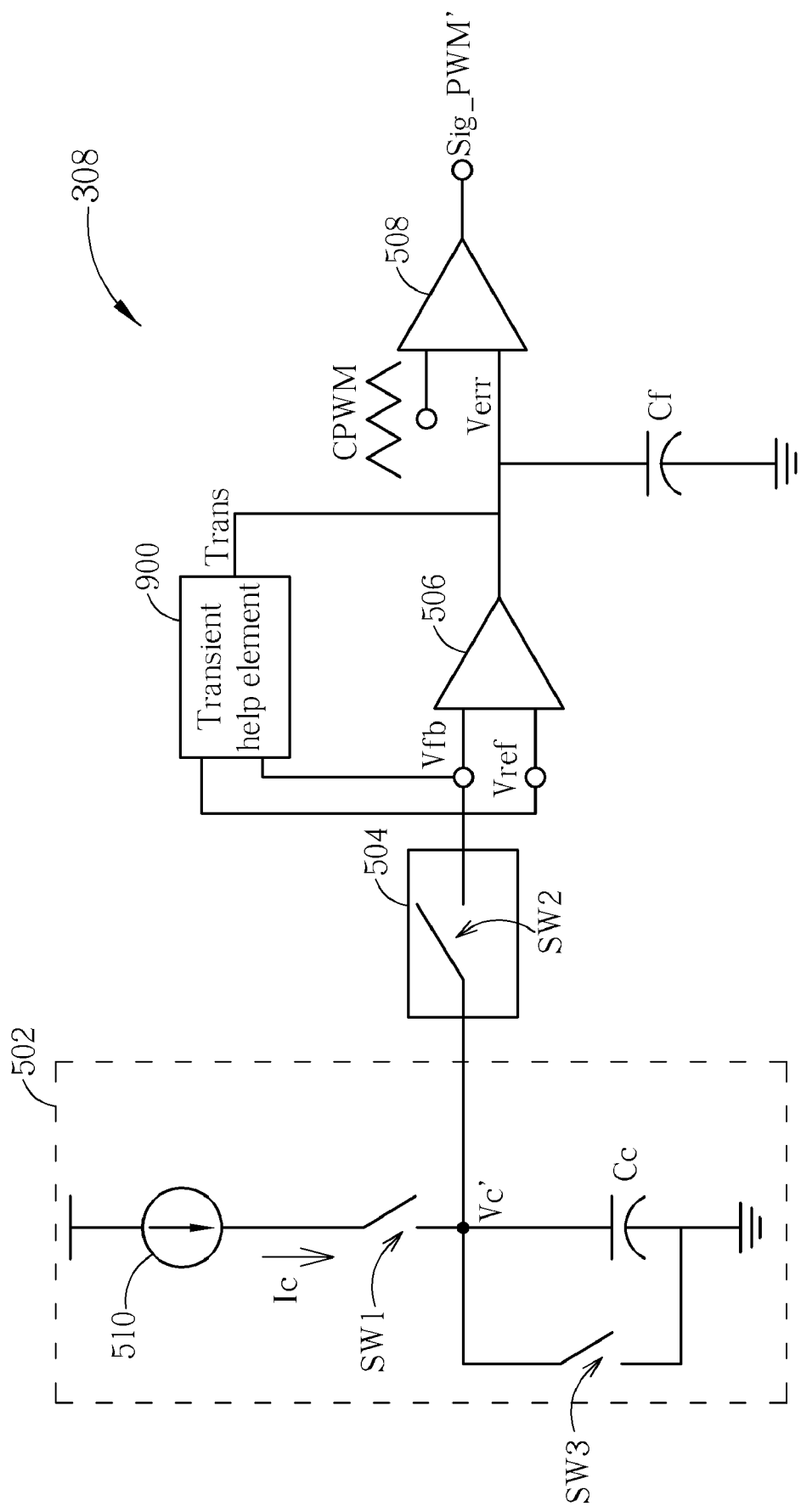
FIG. 9A is a schematic diagram of an error amplifier shown in FIG. 5A further including a transient help element.
Figure 9B:
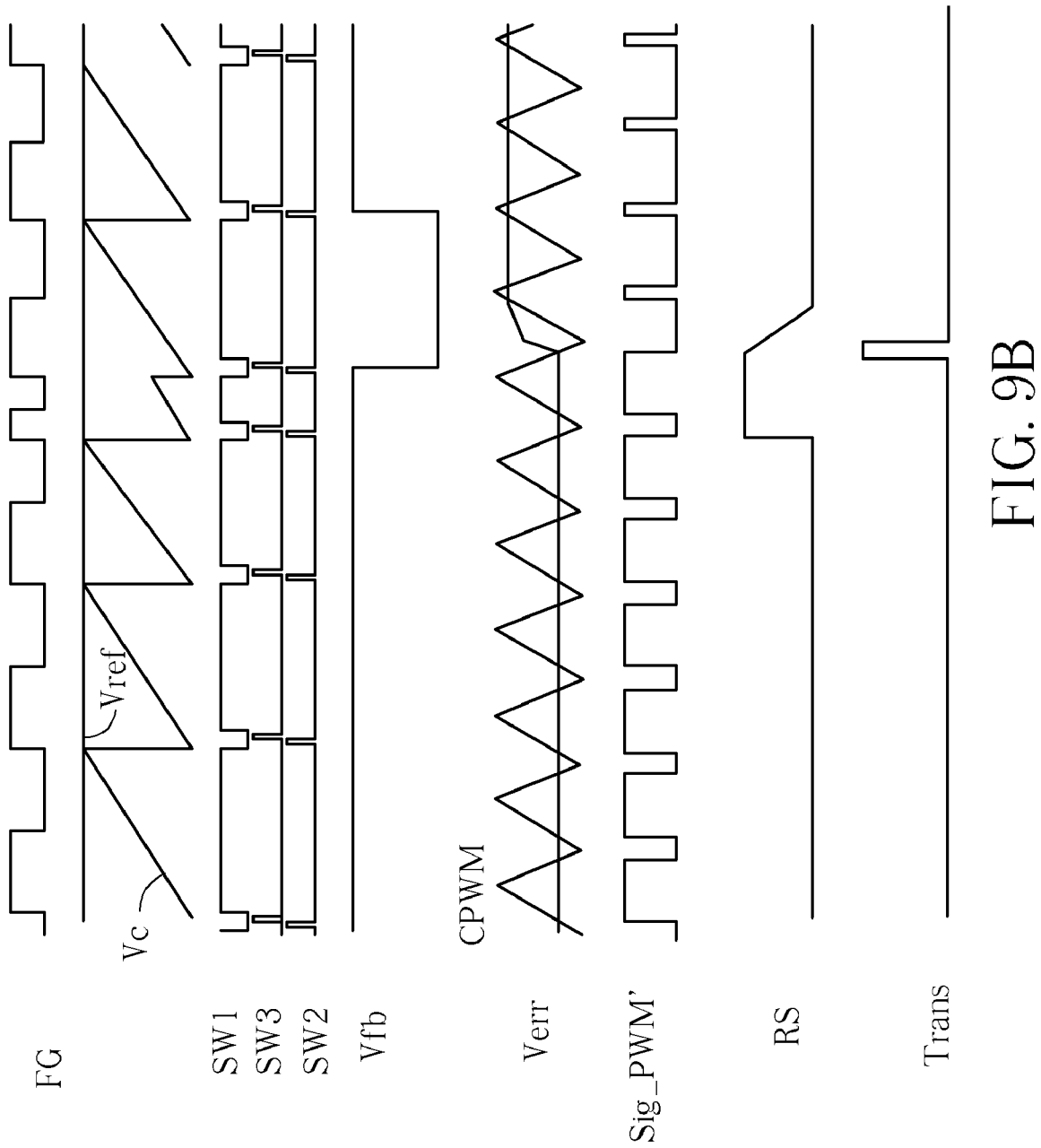
FIG. 9B is a schematic diagram of the rotation speed control circuit shown in FIG. 9A performing control operations when a rotation speed increases.

The spirit of the present invention is that the rotation speed control circuit 308 can alter the on-time of the PWM signal Sig_PWM', to maintain the rotation speed RS at the target rotation speed RS_Tar, and can be intuitively modified according to RS_Tar=Ic/(Cc*Vref), to adjust the target rotation speed RS_Tar. Those skilled in the art should make modifications or alterations accordingly. For example, please refer to FIG. 9A and FIG. 9B. FIG. 9A is a schematic diagram of the error amplifier 506 shown in FIG. 5A further including a transient help element 900, and FIG. 9B is a schematic diagram of the rotation speed control circuit 308 shown in FIG. 9A performing control operations when the rotation speed RS increases. The transient help element 900 generates a transient help signal Trans to accelerate discharging or charging the filter capacitor Cf when a difference between the rotation speed voltage Vfb and the reference voltage Vref is greater than a predefined value, to alter the error voltage Verr. Thus, the on-time of the PWM signal Sig_PWM' can be altered accordingly, so as to accelerate driving the rotation speed RS at the target rotation speed RS_Tar. As shown in FIG. 9B, compared with FIG. 5B, the rotation speed control circuit 308 with the transient help element 900 can decrease the rotation speed RS more quickly when the rotation speed RS increases, in order to drive the rotation speed RS at the target rotation speed RS_Tar.

Figure 10:
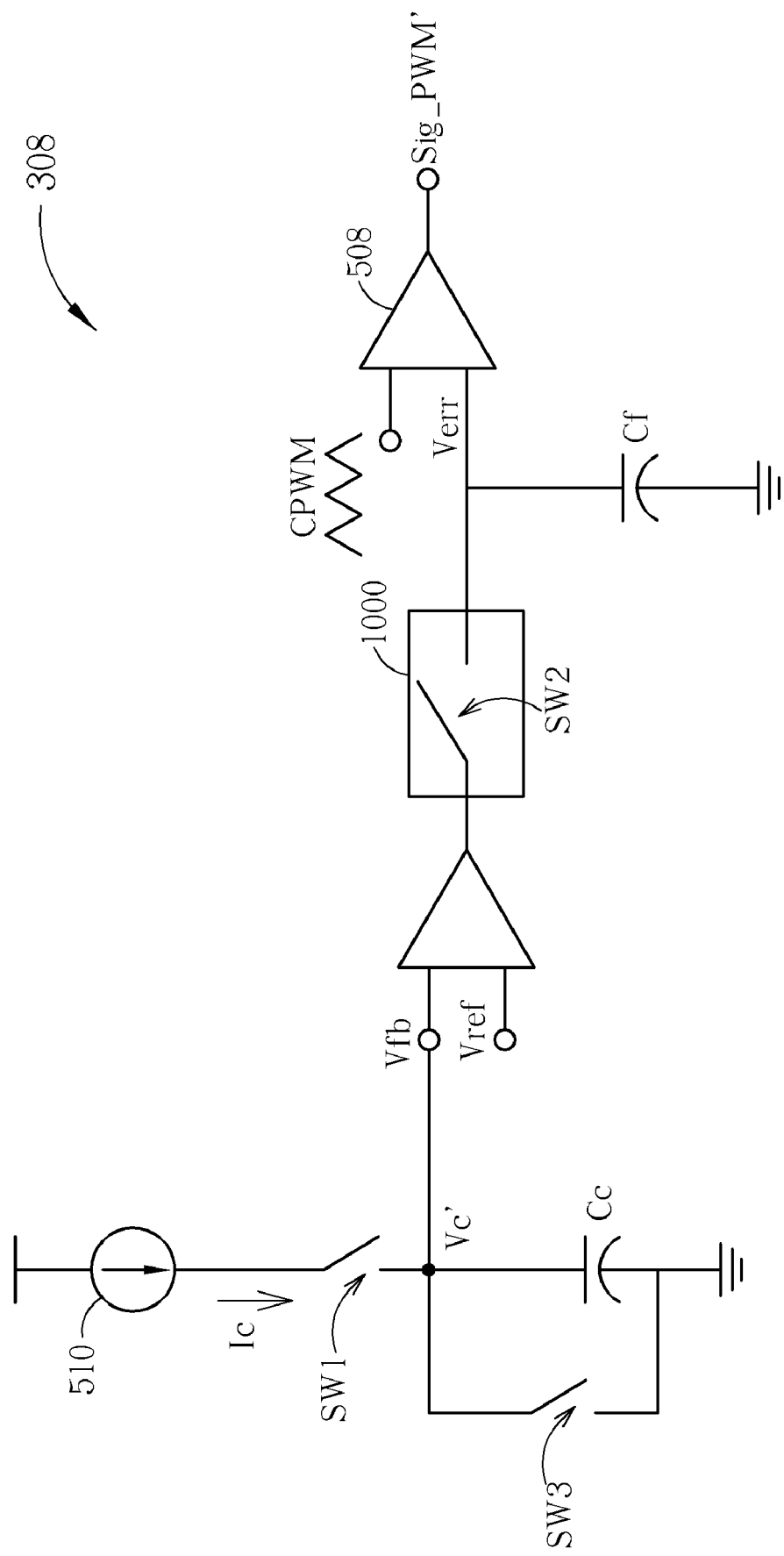
FIG. 10 is a schematic diagram of a sample and hold unit shown in FIG. 5A being relocated to be coupled to a filter capacitor.

In addition, please refer to FIG. 10, which is a schematic diagram of the sample and hold unit 504 shown in FIG. 5A being relocated to be coupled to the filter capacitor Cf as a sample and hold unit 1000, which can be realized by the switch SW2 or other devices as well. The function of the sample and hold unit 504 is to store the rotation speed voltage Vfb, such that the error amplifier 506 can compare the rotation speed voltage Vfb with the reference voltage Vref at a particular moment before a next rising edge of the rotation speed signal FG. However, since switching time of the switch SW2 is long, i.e. ms order and on-chip capacitor cannot be too large, the sample and hold unit 504 may leak and thus reduce accuracy. In comparison, the sample and hold unit 1000 is coupled to the external filter capacitor Cf with larger capacitance, and thus the voltage stored in the sample and hold unit 1000 is more stable, but the circuitry cannot be easily modified. Therefore, if the sample and hold unit 504 can be coupled to an external capacitor with larger capacitance or the sample and hold unit 504 leaks slightly, the sample and hold unit 504 is a more preferable embodiment than the sample and hold unit 1000.

According to the embodiment of the present invention, the switch SW1 is triggered to be turned off at a rising edge of the rotation speed signal FG, to start subsequent operations of the whole circuit of the rotation speed control circuit 308. In practice, the switch SW1 can be triggered to be turned off at a falling edge of the rotation speed signal FG or triggered to be turned off at both a rising edge and a falling edge of the rotation speed signal FG as well, wherein the target rotation speed RS_Tar is double, to start subsequent operations of the whole circuit of the rotation speed control circuit 308. Furthermore, realizations of the fan driving circuit 304, the external PWM signal controller 600, the shifting device 700, and the transient help element 900 are not limited to the circuits of the present invention, as long as functions thereof can be realized. The external PWM signal controller 600 is not limited to adjust the charging current Ic, and can be properly modified to adjust the reference voltage Vref. It should be noted that those skilled in the art can apply the above circuits as a whole or separately according to practical requirements, and both modifications belong to the scope of the present invention. For intuitively modifying the circuitry parameters of the rotation speed control circuit 308 to reach the target rotation speed RS_Tar, realizations are not limited to the above embodiments. Those realizations modified directly or indirectly from the concept of RS_Tar=Ic/(Cc*Vref) belong to the scope of the present invention as well.

Figure 11:
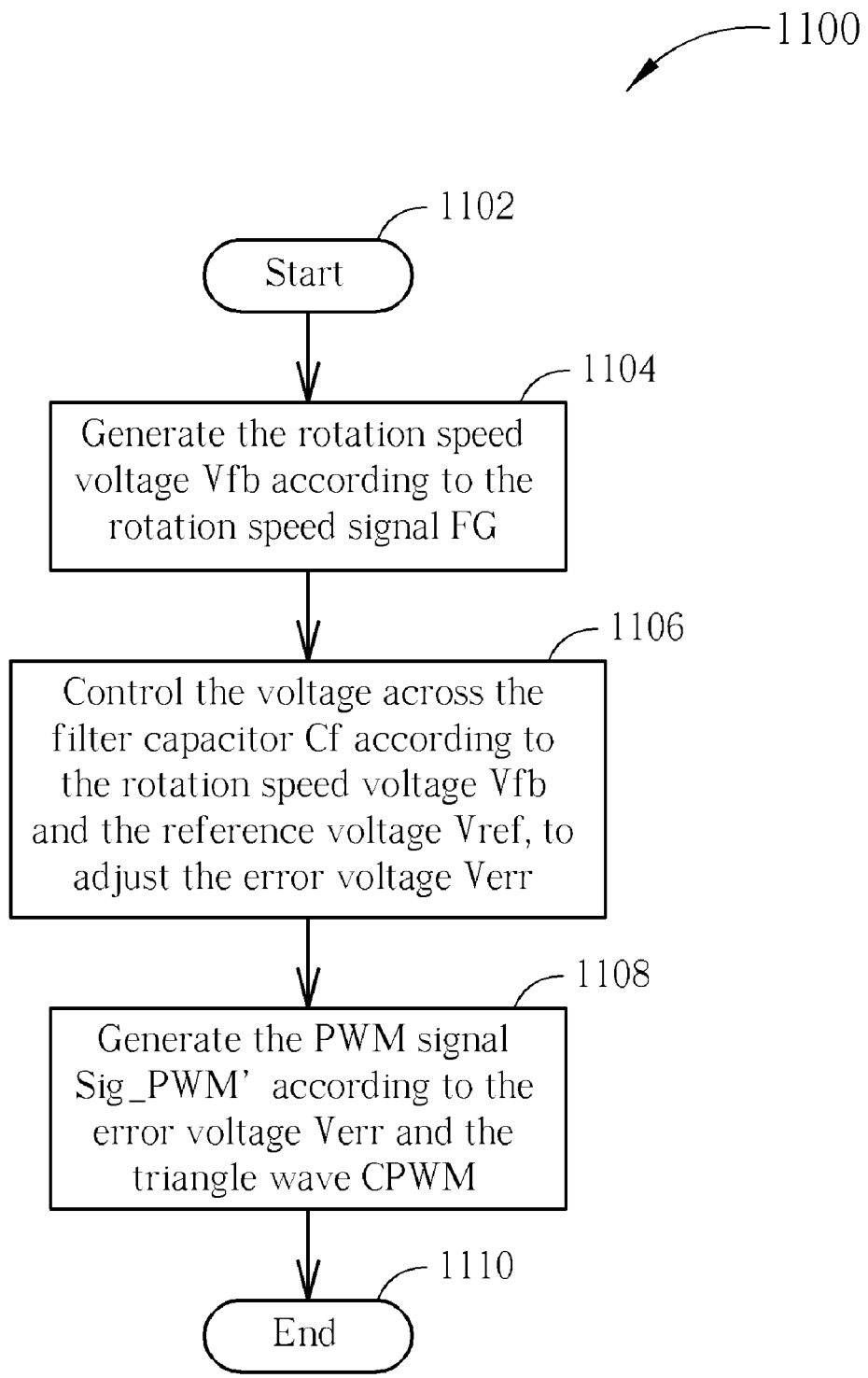
FIG. 11 is a schematic diagram of a rotation speed control process according to an embodiment of the present invention.

Operations of the rotation speed control circuit 308 can be summarized into a rotation speed control process 1100 as shown in FIG. 11. The rotation speed control process 1100 includes the following steps:

Step 1102: Start.

Step 1104: Generate the rotation speed voltage Vfb according to the rotation speed signal FG.

Step 1106: Control the voltage across the filter capacitor Cf according to the rotation speed voltage Vfb and the reference voltage Vref, to adjust the error voltage Verr.

Step 1108: Generate the PWM signal Sig_PWM' according to the error voltage Verr and the triangle wave CPWM.

Step 1110: End.

The rotation speed control process 1100 can be understood by referring to the above description, and therefore further detail is not narrated hereinafter for brevity.

Although the prior art can stabilize the rotation speed RS, it requires complex calculations to modify the target rotation speed RS_Tar. In comparison, the present invention can maintain the rotation speed RS at the target rotation speed RS_Tar, and can further intuitively adjust the target rotation speed RS_Tar according to RS_Tar=Ic/(Cc*Vref). Moreover, the present invention can utilize the transient help element 900 to decrease or increase the rotation speed RS more quickly, so as to drive the rotation speed RS at the target rotation speed RS_Tar, and can utilize the external PWM signal controller 600 to acquire a required target rotation speed by adjusting the duty D, so as to further cooperate with the shifting device 700 to achieve a minimum rotation speed or a minimum enable duty without altering the same maximum target rotation speed RS_Tar acquired by only adjusting the duty D.

Those skilled in the art will readily observe that numerous modifications and alterations of the device and method may be made while retaining the teachings of the invention.

What is claimed is:

1. A rotation speed control circuit for controlling a rotation speed of a fan, comprising:
    a rotation speed detector, for generating a rotation speed voltage according to a rotation speed signal corresponding to the rotation speed;
    a sample and hold unit, coupled to the rotation speed detector, for sampling and storing the rotation speed voltage;
    an error amplifier, coupled to the sample and hold unit, for controlling a voltage across a filter capacitor according to the rotation speed voltage and a reference voltage, to adjust an error voltage; and
    a pulse width modulation (PWM) signal generator, coupled to the filter capacitor, for generating a PWM signal according to the error voltage and a triangle wave;
    wherein the error amplifier discharges the filter capacitor if the rotation speed voltage is greater than the reference voltage, to decrease the error voltage, and the error amplifier charges the filter capacitor if the rotation speed voltage is less than the reference voltage, to increase the error voltage.

2. The rotation speed control circuit of claim 1, wherein the error amplifier further comprises a transient help element, for accelerating discharging or charging the filter capacitor if a difference between the rotation speed voltage and the reference voltage is greater than a predefined value.

3. The rotation speed control circuit of claim 1, wherein the sample and hold unit comprises a second switch, and the rotation speed detector comprises:
    a current source, for generating a charging current;
    a first switch, coupled to the current source, for being turned off to stop conducting the charging current when triggered at a rising edge of the rotation speed signal;
    a charging capacitor, coupled to the first switch, for receiving the charging current to generate a charging voltage to the second switch, wherein the second switch is turned on to output the charging voltage as the rotation speed voltage when the first switch is turned off, and is turned off after outputting the rotation speed voltage; and
    a third switch, coupled to the charging capacitor, for being turned on to connect the charging capacitor to ground after the second switch outputs the rotation speed voltage, to discharge the charging voltage to a zero level;
    wherein the third switch is turned off and the first switch is turned on after the charging voltage is discharged to the zero level, to restart conducting the charging current.

4. The rotation speed control circuit of claim 3 further comprising an external PWM signal controller, coupled to the current source, for adjusting the charging current according to a duty of an external PWM signal.

5. The rotation speed control circuit of claim 4 further comprising a shifting device, coupled to the external PWM signal controller, for adding the charging current to an adding current if a shifting signal indicates a Y-axis shift, and subtracting the charging current from a subtracting current if the shifting signal indicates an X-axis shift.

6. The rotation speed control circuit of claim 5 further comprising an adding current mirror, for subtracting the charging current from the adding current before adjusting the charging current according to the duty if the shifting signal indicates the Y-axis shift, and a subtracting current mirror for adding the charging current to the subtracting current before adjusting the charging current according to the duty if the shifting signal indicates the X-axis shift.

7. The rotation speed control circuit of claim 1, wherein the sample and hold unit is relocated to be coupled to the filter capacitor, for sampling and storing the error voltage.

8. The rotation speed control circuit of claim 3, wherein the first switch is further triggered to be turned off at a falling edge of the rotation speed signal, to stop conducting the charging current.

9. A fan system capable of controlling a rotation speed, comprising:
    a fan;
    a fan driving circuit, for driving the fan according to a pulse width modulation (PWM) signal;
    a rotation speed determination device, for generating a rotation speed signal according to the rotation speed of the fan; and
    a rotation speed control circuit, for controlling the rotation speed, comprising:
        a rotation speed detector, for generating a rotation speed voltage according to a rotation speed signal;
        a sample and hold unit, coupled to the rotation speed detector, for sampling and storing the rotation speed voltage;
        an error amplifier, coupled to the sample and hold unit, for controlling a voltage across a filter capacitor according to the rotation speed voltage and a reference voltage, to adjust an error voltage; and
        a PWM signal generator, coupled to the filter capacitor, for generating the PWM signal according to the error voltage and a triangle wave;
        wherein the error amplifier discharges the filter capacitor if the rotation speed voltage is greater than the reference voltage, to decrease the error voltage, and the error amplifier charges the filter capacitor if the rotation speed voltage is less than the reference voltage, to increase the error voltage.

10. The fan system of claim 9, wherein the fan driving circuit comprises:
    an upper gate switch, for being turned on during an on-time of the PWM signal;
    a lower gate switch, coupled to the upper gate switch, for being turned off during the on-time of the PWM signal; and
    an inductor, coupled to the upper gate switch and the lower gate switch, for generating an inductor current to drive the fan.

11. The fan system of claim 9, wherein the error amplifier further comprises a transient help element, for accelerating discharging or charging the filter capacitor if a difference between the rotation speed voltage and the reference voltage is greater than a predefined value.

12. The fan system of claim 9, wherein the sample and hold unit comprises a second switch, and the rotation speed detector comprises:
- a current source, for generating a charging current;
- a first switch, coupled to the current source, for being turned off to stop conducting the charging current when triggered at a rising edge of the rotation speed signal;
- a charging capacitor, coupled to the first switch, for receiving the charging current to generate a charging voltage to the second switch, wherein the second switch is turned on to output the charging voltage as the rotation speed voltage when the first switch is turned off, and is turned off after outputting the rotation speed voltage; and
- a third switch, coupled to the charging capacitor, for being turned on to connect the charging capacitor to ground after the second switch outputs the rotation speed voltage, to discharge the charging voltage to a zero level;
- wherein the third switch is turned off and the first switch is turned on after the charging voltage is discharged to the zero level, to restart conducting the charging current.

13. The fan system of claim 12, wherein the rotation speed control circuit further comprising an external PWM signal controller, coupled to the current source, for adjusting the charging current according to a duty of an external PWM signal.

14. The fan system of claim 13 further comprising a shifting device, coupled to the external PWM signal controller, for adding the charging current to an adding current if a shifting signal indicates a Y-axis shift, and subtracting the charging current from a subtracting current if the shifting signal indicates an X-axis shift.

15. The fan system of claim 14 further comprising an adding current mirror, for subtracting the charging current from the adding current before adjusting the charging current according to the duty if the shifting signal indicates the Y-axis shift, and a subtracting current mirror for adding the charging current to the subtracting current before adjusting the charging current according to the duty if the shifting signal indicates the X-axis shift.

16. The fan system of claim 9, wherein the sample and hold unit is relocated to be coupled to the filter capacitor, for sampling and storing the error voltage.

17. The fan system of claim 12, wherein the first switch is further triggered to be turned off at a falling edge of the rotation speed signal, to stop conducting the charging current.

18. A rotation speed control method for controlling a rotation speed of a fan, comprising:
- generating a rotation speed voltage according to a rotation speed signal;
- controlling a voltage across a filter capacitor according to the rotation speed voltage and a reference voltage, to adjust an error voltage; and
- generating a pulse width modulation (PWM) signal according to the error voltage and a triangle wave;
- wherein the step of controlling the voltage across the filter capacitor according to the rotation speed voltage and the reference voltage, to adjust the error voltage comprises discharging the filter capacitor if the rotation speed voltage is greater than the reference voltage, to decrease the error voltage, or charging the filter capacitor if the rotation speed voltage is less than the reference voltage, to increase the error voltage.

19. The rotation speed control method of claim 18 further comprising accelerating discharging or charging the filter capacitor if a difference between the rotation speed voltage and the reference voltage is greater than a predefined value.

20. The rotation speed control method of claim 18, wherein the step of generating the rotation speed voltage according to the rotation speed signal comprises:
- turning off a first switch to stop conducting a charging current to charge a charging capacitor at a rising edge of the rotation speed signal
- turning on a second switch to output a charging voltage of the charging capacitor as the rotation speed voltage when turning off the first switch;
- turning off the second switch after outputting the rotation speed voltage, and turning on a third switch to connect the charging capacitor to ground, to discharge the charging voltage to a zero level; and
- turning off the third switch and re-turning on the first switch after discharging the charging voltage to the zero level.

21. The rotation speed control method of claim 20 further comprising adjusting the charging current according to a duty of an external PWM signal.

22. The rotation speed control method of claim 21 further comprising adding the charging current to an adding current if a shifting signal indicates a Y-axis shift, and subtracting the charging current from a subtracting current if the shifting signal indicates an X-axis shift.

23. The rotation speed control method of claim 22 further comprising subtracting the charging current from the adding current before adjusting the charging current according to the duty if the shifting signal indicates the Y-axis shift, or adding the charging current to the subtracting current before adjusting the charging current according to the duty if the shifting signal indicates the X-axis shift.

24. The rotation speed control method of claim 18 further comprising sampling and storing the rotation speed voltage or sampling and storing the error voltage.

25. The rotation speed control method of claim 20 further comprising turning off the first switch at a falling edge of the rotation speed signal.

* * * * *